United States Patent [19]

Igel et al.

[11] Patent Number: 4,684,169

[45] Date of Patent: Aug. 4, 1987

[54] SLIDING AND LIFTING ROOF WITH A LOCKING LEVER

[75] Inventors: Richard Igel, Germering; Alfons Lutz, Emmering, both of Fed. Rep. of Germany

[73] Assignee: Webasto-Werk W. Baier GmbH & Co., Gauting, Fed. Rep. of Germany

[21] Appl. No.: 780,030

[22] Filed: Sep. 25, 1985

[30] Foreign Application Priority Data

Oct. 2, 1984 [DE] Fed. Rep. of Germany ....... 3436044
Dec. 6, 1984 [DE] Fed. Rep. of Germany ....... 3444522

[51] Int. Cl.$^4$ ............................. B60J 7/05; B60J 7/19
[52] U.S. Cl. ..................................... 296/221; 296/224
[58] Field of Search ................. 296/216, 220, 221-224

[56] References Cited

U.S. PATENT DOCUMENTS

| Re. 28,346 | 2/1975 | Kouth et al. | 296/221 |
| 4,364,601 | 12/1982 | Katayama et al. | 296/221 |

FOREIGN PATENT DOCUMENTS

| 1655543 | 7/1970 | Fed. Rep. of Germany | 296/222 |
| 3247474 | 6/1984 | Fed. Rep. of Germany | 296/216 |
| 3300308 | 7/1984 | Fed. Rep. of Germany | . |
| 1261846 | 1/1972 | United Kingdom | . |
| 1346506 | 2/1974 | United Kingdom | . |
| 1349926 | 4/1974 | United Kingdom | . |
| 1418567 | 12/1975 | United Kingdom | . |
| 1523538 | 9/1978 | United Kingdom | . |
| 2068304 | 8/1981 | United Kingdom | 296/216 |
| 2133460 | 7/1984 | United Kingdom | 296/221 |
| 2142379 | 1/1985 | United Kingdom | 296/216 |

Primary Examiner—Randolph A. Reese
Assistant Examiner—Dennis H. Pedder
Attorney, Agent, or Firm—Sixbey, Friedman & Leedom

[57] ABSTRACT

A sliding and lifting roof for vehicles with a rigid cover that is guided by way of forward and rear guide sleds on guide rails and is tiltable around an axis running transversely to the sliding direction has a locking arrangement for preventing sliding of the cover during tilting thereof. This locking arrangement includes at least one of the guide rails being provided with a recess into which a resiliently pretensed, swivelable locking lever engages except when the cover is fully lowered to its sliding position. The locking lever is articulated to the forward guide sled and is swivelable to a released position by contact with the lowered cover or an adjusting member participating in the lowering movement of the cover. In its released position the locking lever is out of engagement with the respectively guide rail.

15 Claims, 6 Drawing Figures

SLIDING AND LIFTING ROOF WITH A LOCKING LEVER

BACKGROUND AND SUMMARY OF THE INVENTION

The invention relates to a sliding and lifting roof for vehicles of the type having a rigid cover that is slidably guided, by way of the front and rear guide shoes, on guide rails running longitudinally on opposite lateral sides of an opening of the roof, and that is mounted, by way of swivel bearings disposed in the area of its forward end, to pivot around an axis running transversely to the direction of sliding by means of lifting arrangements engaging at the rear guide shoes, so that, starting out from a closed position, the cover may selectively be either lowered at its rear edge below the fixed surface of the roof and then slid rearwardly below the fixed surface of the roof or tilted upwardly at its rear edge into a ventilating position.

In particular, the invention relates to such a roof wherein at least one of the guide rails is provided with a recess and a locking lever which is biased in a resilient manner toward a locking position in which the locking lever engages within the recess, except in the case of a lowered edge of the cover. The locking lever prevents a sliding back of the cover during tilting out or lowering of the cover, thereby preventing the cover from hitting on the fixed roof surface and preventing damage to the seal that is normally provided for sealing the marginal gap between the cover and the edge of the fixed roof defining the roof opening.

In the case of a known sliding and lifting roof of this type (German Offenlegungsschrift No. 33 00 308), a locking lever is carried on each side of the lid by an additional guide shoe, which is slidably guided behind the rear guide shoe at the respective guide rails and is connected by way of a swivelable resilient art with a guide link attached to the cover in order to participate in the movement of the cover. The unlocking of the locking levers from the recesses of the guide rails is accomplished, in a first phase, by a shifting of the rear guide shoes in relation to the cover in the sliding direction, as well as in a second phase by a shifting of the cover and, thus of the additional guide shoes in relation to the guide rails, likewise in the cover sliding direction. From the forces which, at the same time, become active in the cover sliding direction and by means of cooperation of a cam follower like sloping portion of the lever with the rear guide shoes and the rear edge of the recesses of the guide rails, components of force are diverted which force the ends of the locking levers engaging with the guide rail recesses in an upward direction. The ends of the locking levers then turn up onto the upper bridges of the guide rails having the recesses and participate in the backward movement of the cover while they are pressed resiliently against the guide rails.

On the basis of the always unavoidable production and mounting tolerances, it is relatively difficult, in the case of the above-noted arrangement, to make sure that the locking levers leave the recesses of the guide rails exactly at the appropriate cover swivelling position. The cooperation at the sloping portions of the locking levers with edges of the rear guide sleds and the recesses of the guide rails produces wear affecting operation, as well. At the same time, and in the case of shifting of the locking levers pressed against the guide rails, considerably frictional losses occur.

In the case of another known sliding and lifting roof (U.S. Pat. No. 4,364,601) a slide member is slidably guided behind a forward guide shoe in a respective guide rail, which carries a locking element that engages into a recess of the guide rail from below, in a range of the cover swiveling movement between the fully extended position and the cover closing position, and thus prevents a sliding movement of the cover. The slide members have a perpendicular slit with which a pin attached to the cover engages. Whenever, starting from the closed position, the cover is lowered, the slide member is compressed, by way of the slit-pin connection, counter to the force of a spring in the channel of the guide rail to an extent that the locking element emerges from the recess of the guide rails and the cover together with the slide member may be pushed backwards. Also in the case of this arrangement, additional slide members are necessary and because the slide members in the case of shifting of the lid counter to the spring force, are pressed against the guide rails, undesirable friction losses occur.

The present invention, therefore, has a primary object of creating a sliding and lifting roof which ensures a correct correlation between the swivelling position of the cover and the unlocking point of at least one locking lever. Furthermore, it is a secondary object to produce locking of the cover without requiring any additional guide shoes or slide members and while avoiding disturbing additional frictional losses.

Departing from sliding and lifting roofs of the above-mentioned type, the above objects are achieved according to preferred embodiments of the invention through the fact that at least one locking lever is articulated to a forward guide sled and is swivelable, by contact with the cover when it is lowered or against an adjusting member that participates in the lowering movement of said cover, into a released position in which it is out of engagement with the respective guide rail.

In the case of the sliding and lifting roof according to the invention, the locking process is force-controlled by the cover itself or by constructional elements carrying the cover without any additional mechanism being required. Because of the control through the cover itself or constructional elements carrying the cover, an exact correlation between the swivel position of the cover and the release point of the locking lever are ensured. Effects of wear are kept particularly small. Additional frictional losses in the case of shifting of the lid which are attributable to the locking arrangement do not occur.

The locking lever may also be developed as an essentially S-shaped, two-arm lever, one end of which may lock into a respective recess of a guide rail while the other end of the lever, upon lowering the rear edge of the cover, comes automatically into engagement with the cover or the adjusting member. For operation of the at least one locking lever, the cover, preferably, carries at least one cam. The cam may be adjustable in the operating direction.

In a modified embodiment, the adjusting member is attached at a lateral shield of the cover. It is particularly advantageous to attach the adjusting member to a connecting rod which connects the forward guide sled and the end of the lifting arrangement on the side of the cover, one with the other, and in regard to which the cover is disposed in a manner that is adjustable in height. Even prior to mounting of the cover, the forward and the rear guide sled will be fixed by way of the locking lever, so that the sliding roof can be premounted and can be tested without the cover. Additional transportation safety arrangements may be omitted, and adjustments in the height of the cover have no influence on the locking lever.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
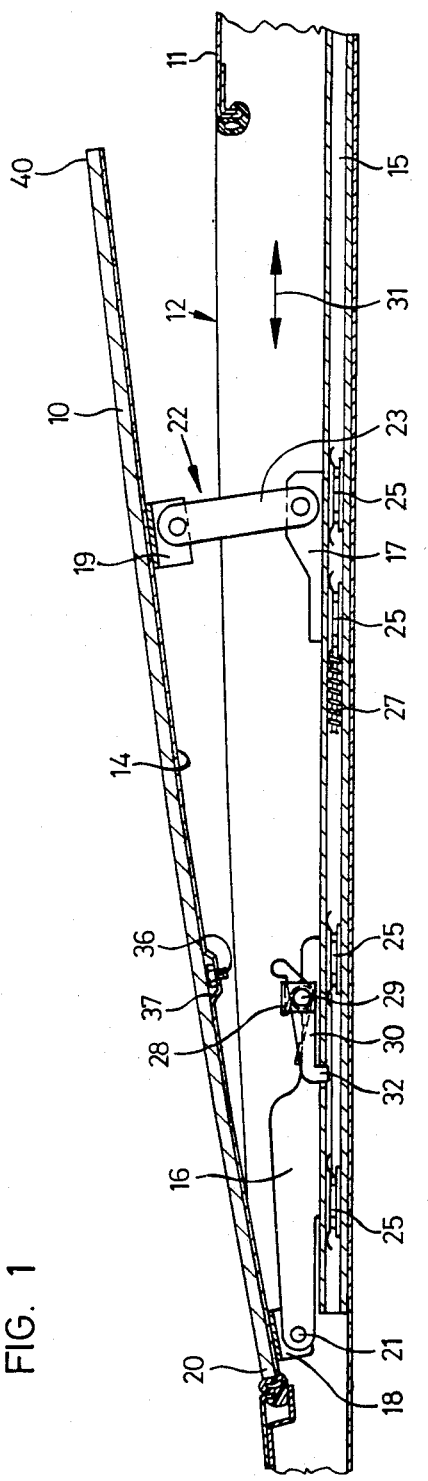
FIG. 1 shows a schematic longitudinal cross-sectional view of a sliding and lifting roof taken along line I—I of FIG. 3, whereby the cover is illustrated in its upwardly extended position.

The sliding and lifting roof shown in the figures has a cover 10 (which may consist of a transparent or translucent material or may also be made from sheet metal) which, in its closed position, seals an opening in a fixed roof surface 11. The roof opening 12 is framed by a seal 13. Instead of or in addition to seal 13, it is also possible to provide a seal encircling the edge of the cover 10. An inner sheet metal panel or frame 14 is secured along the underside of cover 10. At both lateral sides of the roof opening 12, lateral guide rails 15 extend which are connected to the fixed surface 11 of the roof. The cover 10 is slidably guided on the guide rails 15 by way of front and rear guide sleds 16, 17. The guide rails 15 and the other constructional parts of the sliding and lifting roof are disposed essentially mirror symmetrically in relation to a longitudinal center line of the roof. Consequently, only the construction and the method of functioning of the arrangement on one (right-hand) side will be explained in detail, it being understood that like-functioning elements exist on the other (lefthand) side as well.

On the inside sheet metal 14 of the roof, front and rear angle brackets 18, 19 are attached. The forward angle bracket 18 is connected with the forward guide sled 16 by way of a swivel bearing 21 seated near the front edge 20 of the lid 10. The rear guide sled 17 is connected with the rear angle bracket 19 by way of a lifting arrangement, indicated schematically at 22, having a lifting lever 23. Each guide rail 15 has a pair of oppositely facing, laterally open guide channels 24 (FIG. 3) in which guide shoes 25 of the guide sleds 16, 17 are shiftable in a longitudinal direction of the guide rail 15. The drive of the sliding and lifting roof is accomplished, in the case of the illustrated embodiment, by way of pressure resistant spirally wound cables 27, which engage at the rear guide sled 17 and which, on their part, may be in driving connection with a driving motor or a hand crank.

The forward guide sled 16 carries a bearing block 28 which, viewed from in front or from behind, has an essentially inverted U-shaped cross section and on which a locking lever 30 is mounted swivelable, by way of a bearing pin 29, around a horizontal axis running transversely to the sliding directions 31 of the cover. The locking lever 30 is formed with two arms and, viewed from the side, it is essentially S-shaped. At the front end of the locking lever 30, there is a locking catch 32. Locking catch 32 is angled downwards so that it may engage within a recess 33 that is formed in the upper bridge 34 of the guide rails 15. The rear end 34 of the locking lever 30 points upwards and is rounded so as to cooperate with a cam 36 that is provided on the underside of the cover 10.

In the case of the illustrated embodiment, a screw has been provided as cam 36 and is screwed into an aperture of a projecting formation created by a depression 37 formed in the inside metal sheet 14 of the cover. A torsion coil spring 39 is placed round the bearing pin 29 and has a first leg that is supported against the bearing block 28 and a second leg that engages on the locking lever 30 in a manner which pretenses the spring so as to bias the locking lever 30 in the direction of its position engaged with the recesss 33, i.e., in a counterclockwise direction as seen in FIGS. 1 and 2.

Figure 2:
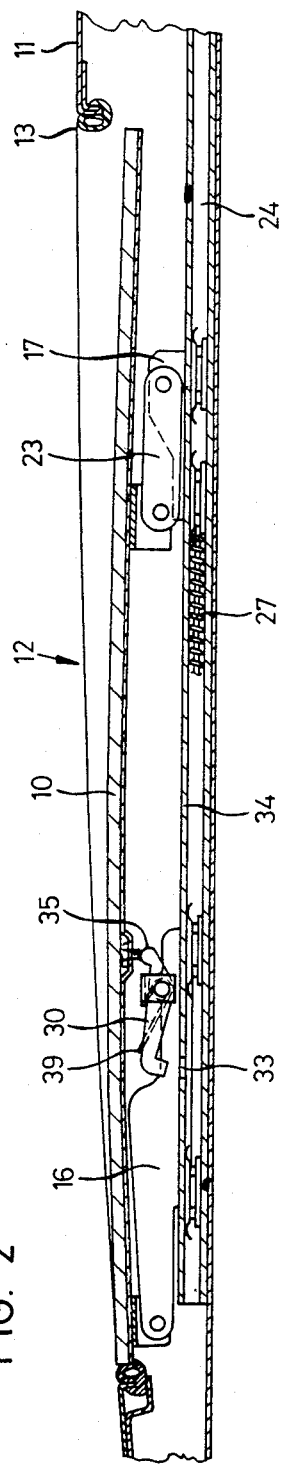
FIG. 2 shows a view corresponding to FIG. 1, but with the cover illustrated with its rear edge lowered below the fixed surface of the roof.
Figure 3:
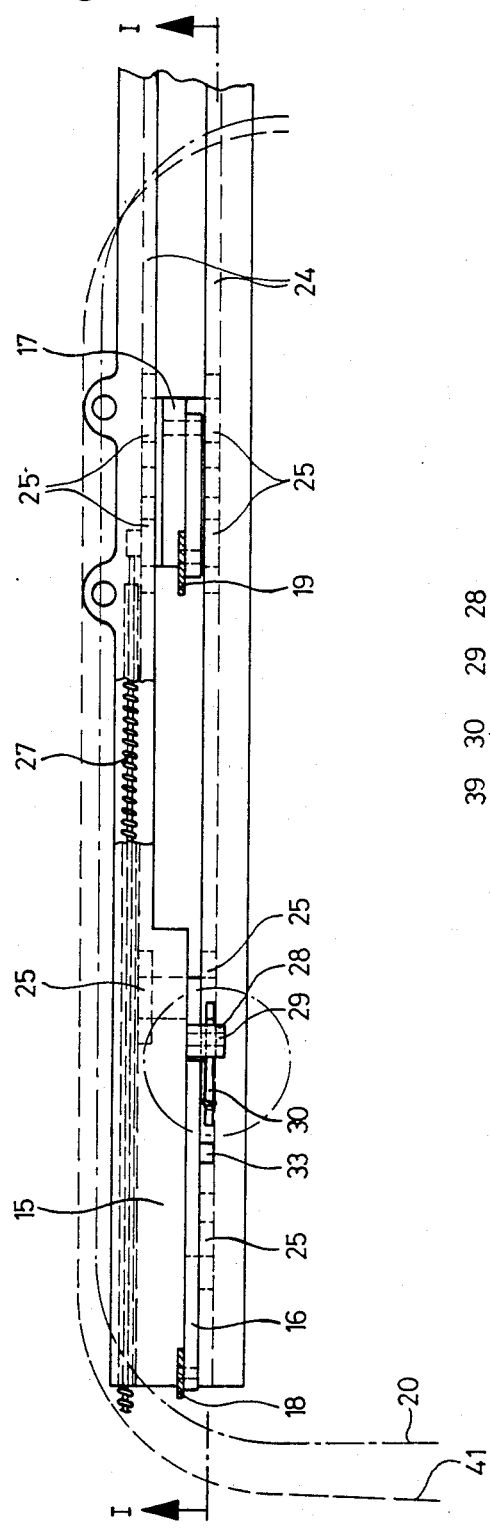
FIG. 3 shows a top view of a right-hand guide rail and associated parts of the sliding and lifting roof, wherein the cover has been slid back somewhat below the fixed surface of the roof.
Figure 4:
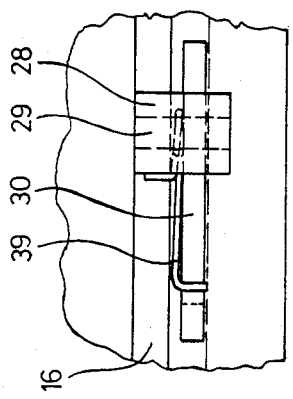
FIG. 4 shows an enlarged view of the encircled portion in FIG. 3.

Whenever the forward guide sled 16 assumes its forward terminal position illustrated in FIGS. 1 and 2, the locking catch 32 is aligned with the recess 33. As long as the cam 36 does not press onto the rear end 35 of the locking lever 30, the locking lever is held by the leg spring 39 in the swivelling position shown in FIG. 1, in which the locking catch 32 engages with the recess 33. As a result, the forward guide sled 16 and with it the cover 10 is locked against any sliding movement in relation to the guide rail 15. Whenever the rear guide sled 17 is moved rearward by way of the drive cable 27, the lifting lever 23 of the lifting arrangement 22 swivels counterclockwise from the FIG. 1 position so that the cover 10, which is secured against sliding movements, is swivelled about bearing 21 into the (unillustrated) closed position in which the lid 10 is essentially aligned with the fixed roof surface 11 and closes the roof opening 12. If the rear guide sled 17 is moved even further in a rearward direction, the rear edge 40 of the cover 10 is lowered below the fixed surface 11 of the roof, the locking catch 32, for the time being, still remaining in engagement with the recess 33, until the cam 36 is placed against the rear end 35 of the locking lever 30 so as to press on the rear locking lever arm. The locking lever 30 is then swivelled counter to the force of the torsion spring 39, in FIG. 2, in a clockwise direction so that the forward guide sled is released whenever the cover 10 has been fully lowered into the FIG. 2 position. Subsequently, the cover 10 may be slid back below the fixed surface 11 of the roof by means of the drive cable 27. A starting phase of this movement is illustrated in FIG. 3, where the forward edge of the roof opening 12 is indicated at 41 and the forward edge of the lid 10 at 20 in broken and dot-dash lines respectively. During the movement of the lid as it is slid rearward to expose the roof opening, the locking lever 30 remains in the swivelling position according to FIG. 2, in which it is not only disengaed from recess 33, but is also held out of frictional engagement with the guide rail 15.

Whenever, subsequently, the cover 10 is again shifted back to the forward terminal position of the forward guide sled 16, the locking catch 32 remains above the recess 33 until the rear edge 40 of the cover 10 is raised. When the cover is raised, the locking catch 32 engages recess 33 under the influence of the torsion spring 39 shortly before the cover reaches its closed position. In the case of where the cover is tilted upwardly, the locking lever 30 remains engaged.

By shifting of the screw forming the cam 36, the point of engagement may be adjusted. It is understood that one may possibly also do without such an adjustment. In that case, the locking lever 30 may, for example, be controlled directly by the depression 37 of the inside metal sheet 14 of the cover or by a sound dampening liner attached to it.

Whenever the guide rails 15 and the functioning mechanism inclusive of the guide sleds 16, 17 are delivered as a preassembled unit with which the lid will be connected only during its insertion into the vehicle, the locking lever 30 may also effectively be used as a transportation safety by being placed in its locked condition.

Figure 5:
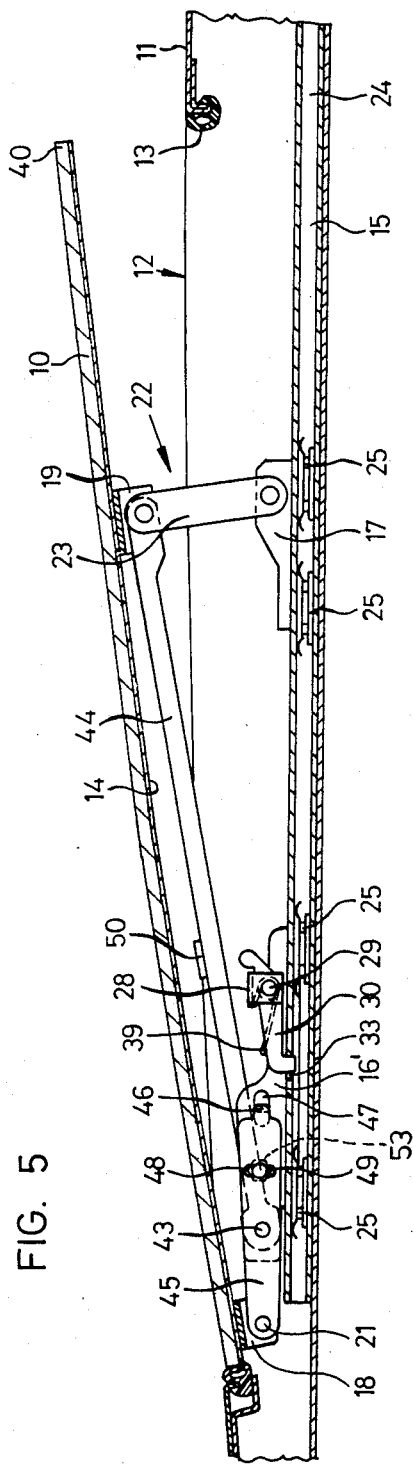
FIG. 5 shows a cross-sectional view corresponding to FIG. 1 for a modified embodiment of the invention.

In the case of the modified embodiment of the sliding and lifting roof illustrated in FIG. 5, the forward guide sled 16' is conected with lifting arrangement 22 by way of a connecting rod 44 that is pivotally connected to it at 43. The swivel bearing 21 is seated at the forward end of an adjusting arm 45 at the rear end of which an articulated catch 46 protrudes laterally. The catch 46 of the adjusting arm 45 engages with a longitudinal slot 47 of the guide sled 16' that extends in parallel to the guide rail 15. In the adjusting arm 45, an elongated hole 48 is provided on arm 45 that stands essentially vertically perpendicular in relation to the guide rail 15. The shaft of a screw 49 that is firmly connected with the forward guide sled 16' protrudes through elongated hole 48. This development permits a limited swivel movement of the adjusting arm 45 around an axis formed by the catch 46 and, thus, an alignment in height of the cover 10. That is, with screw 49 loose, adjusting arm 45 may be moved to align the height of cover 10. Thereafter, by tightening of a nut 53 screwed onto the screw 49, the cover 10 is fixed in its aligned position of height. The adjustment of height of the cover 10 has no influence on the position of the pivot 43 between the guide sled 16 and the connecting rod 44. Consequently, the locking lever 30 is operated by way of a catch 50 that protrudes laterally from the connecting rod 44 and independently of the adjusted height of the cover relative to guide sled 16.

Whenever the guide rails and the functioning mechanisms of the sliding and lifting roof inclusive of the guide sleds 16, 17 are developed as a preasembled mounting unit with which the cover will be connected only later during installation into the vehicle, the locking lever 30 acts simultaneously also as a transportation safety for the rear guide sled 17 by way of the connecting rod 44. A separate transportation safety for this sled may, therefore, be omitted as well as a transportation safety for the forward sled 16. Moreover, a test run may be accomplished without trouble and without the cover 10.

Figure 6:
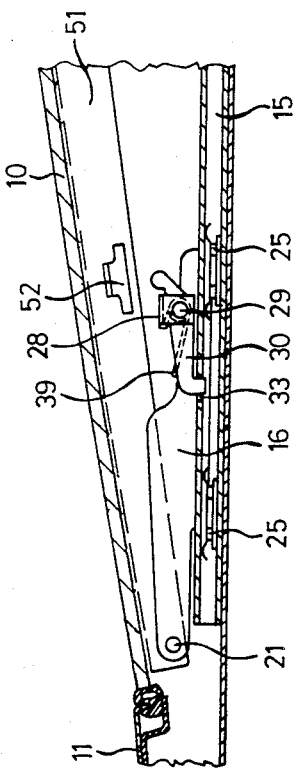
FIG. 6 shows a partial cross-sectional view of an additional embodiment.

In the further modified embodiment according to FIG. 6, there is a lateral shield 51 at both sides of the cover 10. On the lateral shield 51, a catch 52 has been disposed for the operation of the locking lever 30.

While we have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

We claim:

1. Sliding and lifting roof for a vehicle having a rigid cover that is slidably guided by way of front and rear guide sleds on a respective longitudinally extending guide rail running at each of opposite lateral sides of an opening of the roof, and said cover also being mounted by way of swivel bearings, disposed in an area of its forward end, for pivotal movement, about an axis running transversely to the length of the guide rails by means of lifting arrangements engaging at the rear guide sleds, from a closed position selectively either so that its rear edge is raised above a fixed portion of the roof or is lowered below the fixed portion of the roof, wherein at least one of the guide rails is provided with a recess with respect to which one end portion of a respective locking lever is disengageable against the action of a resilient biasing means only when the rear edge of the cover is in a fully lowered position for retraction below the fixed portion of the roof, said locking lever being pivotally connected at an intermediate portion to a respective front guide sled for pivotal movement about an axis and being constructed and arranged, relative to one of the cover and a part that is mounted to the cover so as to move in conjunction therewith, for being pivoted about said axis by a force applied to another end portion of said lever by one of said cover and said part into a release position in which the locking lever is rocked out of engagement with the respective guide rail recess when the cover is lowered into its position for retraction.

2. Sliding and lifting roof as in claim 1, wherein the locking lever is an essentially S-shaped two-armed lever, one end of which is engageable in the respective recess of the guide rail while the other end of the lever, upon said lowering of the cover into its position for retraction automatically comes into engagement with the cover or said part that is associated therewith.

3. Sliding and lifting roof as in claim 2, wherein the locking lever is shifted into the release position by the part that mounted to the cover, said part being carried by the cover and being at least one cam for the operation of a respective said locking lever.

4. Sliding and lifting roof as in claim 3, wherein the cam is adjustable for adjusting the operational point at which it acts upon the locking lever.

5. Sliding and lifting roof as in claim 1, wherein the locking lever is shifted into the release position by the part that mounted to the cover, said part being carried by the cover and being at least one cam for the operation of a respective said locking lever.

6. Sliding and lifting roof as in claim 5, wherein the cam is adjustable for adjusting the operational point at which it acts upon the locking lever.

7. Sliding and lifting roof as in claim 1, wherein the locking lever is shifted into the release position by the part mounted to the cover, said part being attached to a lateral shield of the cover.

8. Sliding and lifting roof as in claim 2, wherein the locking lever is shifted into the release position by the part mounted to the cover, said part being attached to a lateral shield of the cover.

9. Sliding and lifting roof as in claim 1, wherein the locking lever is shifted into the release position by the part mounted to the cover, said part being attached to a connecting rod which connects the forward guide sled to an end of a respective lifting arrangement adjacent the cover in a manner enabling adjustment of the height of the cover without affecting operation of the locking lever by said part.

10. Sliding and lifting roof as in claim 2, wherein the locking lever is shifted into the release position by the part mounted to the cover, said part being attached to a connecting rod which connects the forward guide sled to an end of a respective lifting arrangement adjacent the cover in a manner enabling adjustment of the height of the cover without affecting operation of the locking lever by said part.

11. Sliding and lifting roof according to claim 1, wherein the locking lever is shifted into the release position by a part of the cover.

12. Sliding and lifting roof according to claim 10, wherein said part of the cover is an adjustable cam.

13. Sliding and lifting roof according to claim 11, wherein said adjustable cam is a screw threaded into a projecting formation at the underside of the cover.

14. Sliding and lifting roof according to claim 12, wherein the locking lever is an essentially S-shaped two-armed lever, one end of which is engageable in the respective recess of the guide rail and an opposite end of which is automatically engaged with the adjustable cam when the cover is lowered into its position for retraction.

15. Sliding and lifting roof according to claim 11, wherein the locking lever is an essentially S-shaped two-armed lever, one end of which is engageable in the respective recess of the guide rail and an opposite end of which is automatically engaged with said one of said cover and said part when the cover is lowered into its position for retraction.

* * * * *